Figure 1:
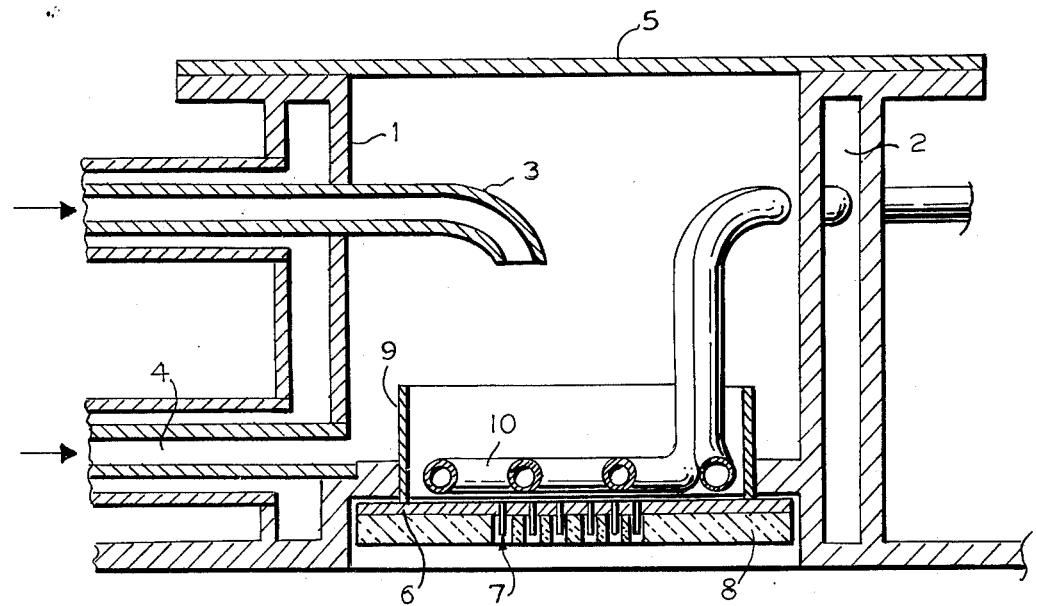

United States Patent [19]
Bradley

[11] 3,952,078
[45] Apr. 20, 1976

[54] METHOD OF PRILLING AMMONIUM NITRATE AND UREA THROUGH EPOXY-RESIN LINED BORES

[75] Inventor: John Kenneth Bradley, Ipswich, England

[73] Assignee: Fisons Limited, London, England

[22] Filed: Jan. 17, 1974

[21] Appl. No.: 434,119

Related U.S. Application Data

[62] Division of Ser. No. 246,274, April 21, 1972, abandoned.

[52] U.S. Cl. .................................. 264/13; 264/14; 425/461
[51] Int. Cl.² ........................................... B01J 2/02
[58] Field of Search ............... 264/13, 14, DIG. 51, 264/7; 425/118, 461

[56] References Cited

UNITED STATES PATENTS

| | | | |
|---|---|---|---|
| 2,113,279 | 4/1938 | Olin et al. | 264/14 |
| 3,001,228 | 9/1961 | Nack | 264/DIG. 51 |
| 3,457,336 | 7/1969 | Harris | 264/14 |

Primary Examiner—Robert F. White
Assistant Examiner—J. R. Hall
Attorney, Agent, or Firm—Wenderoth, Lind & Ponack

[57] ABSTRACT

The invention relates to the prilling of molten materials, notably ammonium nitrate and/or urea, through prilling bores which have an epoxy resin internal surface. This surface enables a greater through-put to be obtained with ammonium nitrate and/or urea when compared to bare metal bores.

7 Claims, 2 Drawing Figures

U.S. Patent April 20, 1976 3,952,078

METHOD OF PRILLING AMMONIUM NITRATE AND UREA THROUGH EPOXY-RESIN LINED BORES

This is a division of application Ser. No. 246,274 filed Apr. 21, 1972, now abandoned.

The present invention relates to prilling processes using a prilling head.

In a prilling process, molten material is formed into droplets which are then allowed to fall down a cooling tower in which they solidify. The droplets are conveniently formed by allowing the molten material to flow through a plurality of nozzles in the base (or distributor plate) of a vessel (or prilling head) in which the molten material is held. However, the through-put of molten material through the nozzles in the distributor plate is less than would be expected from theoretical considerations and prilling heads using gravity fed multi-orifice distributor plates have had to be operated at below the expected design production rate where molten materials containing ammonium nitrate and/or urea are being prilled. It has been proposed to treat the interior surfaces of the bores in the distributor plate with silicone resins or polytetrafluoroethylene. However, these treatments have not improved the production rate from the bore and have caused the droplets produced to vary erratically in size.

We have now found that the through-put of molten materials containing ammonium nitrate and/or urea can be improved without affecting the uniformity of droplet size produced if the inerior of the nozzle is provided with an epoxy resin surface.

Accordingly, the present invention provides a process for prilling molten material containing ammonium nitrate and/or urea through a bore, characterised in that the interior surface of the bore is an epoxy resin surface.

The invention is a process using a plate having a plurality of longitudinal bores therethrough characterised in that the interior surfaces of the bores are epoxy resin surfaces.

The bores may be merely those which have been bored through a distributor plate of a prilling head which is typically a circular or rectangular plate made from mild or stainless steel. However, it is preferred that the bores be the internal bores of tubes set into the distributor plate to form nozzles through which molten material flows. These tubes may be made from the same material as the rest of the distributor plate, in which case the tubes may form an integral part of the distributor plate. Alternatively, the tubes may be removable, e.g. be stainless steel capillary tubes fitted into suitable bores in the distributor plate.

The distributor plate may be of any suitable size and shape but is typically a circular plate of from 0.3 to 2, e.g. 1, meters in diameter or a rectangular plate 0.3 to 2 meters wide and 0.5 to 3 meters long, the plate being from 0.5 to 5, e.g. about 1, cms thick. The length and diameter of the bores may be varied over comparatively wide ranges depending upon the size of droplet which it is desired to form from the bore and the pressure at which molten material is fed to the bore. In the case where molten material flows through the bore under gravity, the pressure will depend upon the head of liquid which is maintained above the bore outlet. The optimum dimensions of the bore can be readily determined for any given case. However, in general with a gravity fed bore operating with 7.5 cms head of molten ammonium nitrate, we have found that bores of from 0.75 to 2 mms internal diameter and from 12 to 15 mms length give satisfactory results in the production of prills in the size range of 2 to 3 mms. It will be appreciated that unless the distributor plate surface is recessed around the outlets of the bores, the thickness of the plate should not exceed the desired length of the bores. It is preferred that the bore outlets should form nozzle orifices standing proud of the plate surface.

The number and spacing of the bores in the distributor plate will depend upon the rate of production required from the plate; the greater the number of bores the greater the production rate for a given plate area. However, excessively close spacing of the bores may lead to collision of the droplets issuing from the bores and it is therefore preferred to use spacings of not less than 0.5 cms, e.g. 0.75 – 2 cms.

The epoxy resin surface to the bore is obtained by applying a prepolymer to the bore and then curing it in situ. Curing is achieved by the use of a catalyst and/or a reactive hardener. Many types of prepolymers and curing agents are known and commercially available and the ones for present use are selected from those which give rise to a resin which is chemically and physically stable under the conditions obtaining during prilling. Thus, the resin should be inert to the material being prilled and should possess high thermal stability. It is preferred to use prepolymers which have been produced by the condensation of epichlorhydrin with a bisphenol of the formula

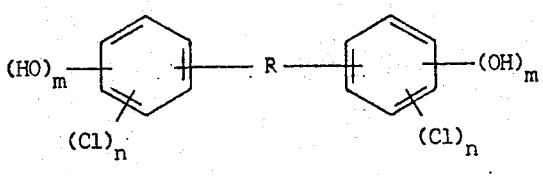

wherein $n$ and $m$ are integers and have valves of 0 to 2 and 1 to 4 respectively and R is an alkylene group. It is preferred that R have the formula

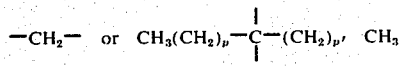

in which $p$ and $p'$ need not have the same values and each is an integer of from 0 to 2. Thus, suitable bisphenols for present use are diphenylolmethane, diphenylolpropane (known as Bisphenol A) and 2,2-di(-dichlorophenylol)propane (known as tetrachloro Bisphenol A).

We prefer to use solid prepolymers having hydroxyl functionalities of from 7 to 10, i.e. those obtained by condensing less than 2 molar proportions of epichlorhydrin with each molar proportion of bisphenol. Many suitable prepolymers are commercially available and may be used as such. A particularly preferred prepolymer for present use is that sold under the Trade name of Araldite AY18.

The curing agents for present use will in general be aromatic primary or tertiary amines or anhydrides of carboxylic acids although a resin prepolymer manufacturer may specify other curing agents, e.g. borontrifluoride, for a particular prepolymer. Typical curing agents for present use include m-phenylenediamine, 4-4′ methylenedianiline, diaminodiphenyl sulphone, dimethylaminomethylphenol, tri-(dimethylaminomethyl)-phenol, phthalic anhydride, maleic anhydride and trimellitic anhydride.

Again many curing agents are commercially available and indeed a resin manufacturer will usually specify a given combination of resin and curing agent.

The application of the mixture of prepolymer and curing agent and its curing in situ are carried out in the normal manner. Thus, where the distributor plate and its nozzles are made from steel, the bores are first cleaned, e.g. degreased, and then the prepolymer/curing agent mixture is applied as a coating to the bores (e.g. as a solution in a suitable solvent, such as methyl ethyl ketone) which is painted or sprayed onto the walls of the bore and then cured following evaporation of the solvent.

Care should be taken to minimize contact of the epoxy resin with the outer surfaces of the nozzles, since the resin may assist creeping of the molten liquid across the outer surface of the distributor plate during prilling. If excessive creeping takes place, the drop size formed by each nozzle will vary and in extreme cases bridging between adjacent nozzles may occur leading to malfunction of the distributor plate.

The epoxy resin layer on the walls of the bore is of the minimum thickness commensurate with cost and adequate improvement in prilling rate. For example, we have found that layers of from 0.0025 to 0.125 mms, e.g. about 0.025 mms, thickness are satisfactory.

In an extreme case, the nozzles may be made from an epoxy resin, e.g. in the form of resin tubes which are mounted in suitable bores in a steel distributor plate. Alternatively, the plate and nozzles may be formed wholly from an epoxy resin. However, in both these cases it is desirable to treat the exterior of the nozzles and distributor plate as described below to reduce creeping of the molten material during prilling.

In order to reduce the risk of creep of the molten material onto the external surfaces of the distributor plate, we prefer to provide the exterior surface of the plate and any upstanding nozzles formed by the bore outlets with a surface which is not readily wet by the molten material which is to be prilled. This surface may take the form of a coating which is sprayed, painted or otherwise applied to the plate and nozzles. Conveniently the nozzles are provided with an external sleeve of non-wetted material, optionally in combination with a non-wet coating on other external parts of the distributor plate. The surface coating or sleeve which is to be non-wetted by the molten material may be made from a number of suitable substances depending on the material to be prilled. Thus, the substance may be a fluorinated hydrocarbon polymer, e.g. polytetrafluoroethylene; a mixture of polymeric or ceramic materials containing a fluorinated hydrocarbon; or a silicone. The use of a silicone rubber coating, e.g. of methyl-phenyl-polysiloxane, is especially preferred.

In order to further reduce creep of the molten material onto the external surfaces of the distributor plate, it is preferred to form the orifice of the nozzle with a sharp rim. This is conveniently achieved by tapering the nozzle of the bore outlet towards the orifice so that, for part or all of the length of the nozzle, the wall thickness is reducing progressively towards the orifice. Ideally the taper should be as fine as is feasible.

The distributor plate used in the present invention finds use with a wide variety of prilling heads which are essentially tanks for which the distributor plate forms the base. It is preferred that the prilling head be provided with means for maintaining a constant head of molten material above the distributor plate, thus assisting the formation of uniformly sized droplets at the nozzles. The constant head is conveniently achieved by means of an overflow outlet or wier in the prilling head wall. It is also preferred that the distributor plate be provided with heating means so as to reduce heat losses from the molten material to the plate as it passes through the bores. The heating means is, for example, a heating coil mounted on the plate.

The distributor plate used in the invention, used in place of conventional untreated plates to form the base of the prilling head, is mounted at the top of a cooling tower. The cooling tower may be of conventional type or may be modified by the provision of a flexible lining therein made for example from an impervious smooth surfaced material, e.g. PVC coated nylon or canvas fabric or PVC or polyethylene sheeting, which flexes, e.g. due to the passage of air through the tower, and thus minimizes solids build up within the tower. An alternative tower lining for present use is closely woven nylon or other fabric. If desired pressure waves may be induced in the molten material as it passes through the bores of the distributor plate by providing a transverse plate in the prilling head just above, e.g. 0.2 to 2.5 cms above the distributor plate, the transverse plate being reciprocated at less than 200 cycles per second, e.g. at 50 to 120 cycles per second.

In use, molen material is passed through the bores of the distributor plate used in this invention to form droplets of molten material which fall down a cooling tower to yield solidified droplets or prills. As stated above the distributor plate is especially effective in the prilling of materials containing ammonium nitrate and/or urea. Suitable materials which may be prilled include ammonium nitrate/ammonium phosphate melts, mixtures of urea and potassium chloride, mixtures of ammonium nitrate and ammonium sulphate. It is preferred that the molten materials be liquids as opposed to slurries and that they contain less than 2 percent, e.g. 0 to 0.5 percent w/w of water and that they be prilled at a temperature up to 30°C, e.g. 1° to 10°C, above their melting point. Particularly preferred materials for present use are those containing a major proportion of urea or ammonium nitrate; notably melts of substantially pure ammonium nitrate or urea optionally containing up to 30 percent w/w of ammonium phosphate. Where molten ammonium nitrate alone is being prilled, this may contain up to 5 percent w/w of an internal desiccant salt e.g. magnesium sulphate, magnesium nitrate, magnesium oxide, aluminium sulphate or mixtures thereof.

While the molten droplets may be caused to fall down a void cooling tower up which a stream of cooling gas, e.g., air, may be passed, it is preferred to cause the droplets to fall while still molten through a suspension of fine solid particles. The use of such a dust phase enables the height of the cooling tower to be reduced, e.g. from 50 meters or more to about 5 meters in the case where ammonium nitrate is being prilled. Furthermore, since the droplets pick up dust from the dust phase as they pass through it, it is possible to modify the properties of the final product by the use of appropriate materials in the dust phase.

In operating the prilling process using a dust phase, dust particles having a size preferably less than 50 microns are introduced into a gas stream, e.g. air, flowing up the cooling tower so as to provide from 0.0008 to 0.0024 gram of dust per cubic centimeter of gas. The gas flow rate up the tower is preferably from 0.3 to 1.2, e.g. 0.5 to 0.7, meters per second and the dust phase is at least 1 meter deep. Suitable dusts for present use include fuller's earth; ball clay; china clay; attapulgite; bentonite; montmorillonite; talc; silica; phosphate rock; magnesia; pyrophyllite; salts or compounds of calcium, magnesium or aluminium, e.g. the oxides, hydroxides, sulphates or nitrates thereof and hydrates thereof; surface-active agents, e.g. the alkali or alkaline-earth metal salts of long chain fatty acids, e.g. calcium stearate; long chain fatty acid amides; basic slag; the material being prilled or another fertilizer material, e.g. potassium chloride, potassium sulphate, potassium metaphosphate, ammonium sulphate or mono- or di-ammonium phosphate. If desired a mixture of materials may be used and where a mixture of dusts is used in which one dust is less readily wetted than the other by the molten material, the amount of dust picked up by the molten droplets may be controlled by varying the proportions of each component of the dust mixture. Particularly preferred dust mixtures for present use are mixtures of fullers' earth, bentonite or montmorillonite (95 to 40, preferably 85 – 75, parts by weight) with talc (5 to 60, preferably 15 to 25, parts by weight); magnesium oxide (5 – 20 parts by weight) with talc (95 – 80 parts by weight); and phosphate rock (50 – 90 parts by weight) with talc (10 – 50 parts by weight) optionally also with magnesium oxide (up to 2.5 parts by weight).

In a particularly preferred manner of operating the cooling tower, a fluidized bed of solid particles, e.g. 15 to 60 cms deep, is formed below the dust phase. This fluidized bed serves as a cushion into which the dust coated but incompletely solidified droplets fall, as a cooling bed in which the droplets are further cooled and also as a further treatment of the droplets in that the droplets will usually pick up a further coating of particles from the fluidized bed. The fluidized bed may therefore be formed from any of the materials specified above for use in the dust phase, although the dust phase and fluidized bed materials need not be the same; or may be formed from product droplets. Conveniently, the fluidized bed is formed by feeding a single powder to the cooling tower, which powder contains particles of sizes varying from, say, less than 10 microns to 50 microns or more. In the tower the powder segregates in the gas stream to form a lower fluidized bed zone and an upper dust zone.

The fluidized bed may be formed using a separate gas stream from that used to form the dust phase in which case a slower gas flow rate is used for the fluidized bed than for the dust phase, e.g. 3 to 12 cms/second.

Figure 2:
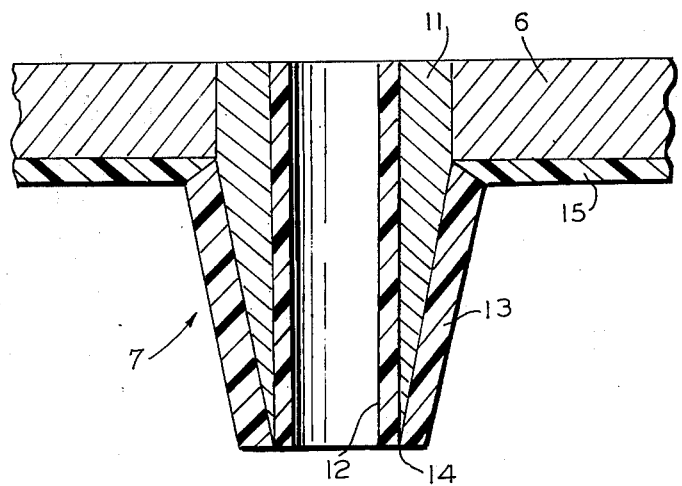

The present invention is illustrated by way of example only with respect to the accompanying drawings in which FIG. 1 is a diagrammatic vertical section of a prilling head incorporating a distributor plate of the invention; and FIG. 2 is a diagrammatic vertical section of one of the nozzles showing in exaggerated form the coatings on the nozzle surfaces.

The prilling head comprises a steel walled cylindrical tank 1 provided with a steam jacket 2, an inlet 3 for the material to be prilled, an outlet 4 for excess material and a lid 5. At the base of tank 1 an internal shoulder is inset into the tank and carries a distributor plate 6 which forms an inset base to tank 1. The plate 6 is provided with a plurality of nozzles 7 whose construction is shown more clearly in FIG. 2. The exterior surface of plate 6 is provided with a thermally insulating layer 8. The plate 6 is provided on its interior surface with an annular wall 9, spaced from but substantially concentric with the side wall of tank 1. The wall 9 forms an internal tank within the main tank 1, which interior tank is fed with molten material from inlet 3 and serves the nozzles in the distributor plate 6. Excess feed material overflows over wall 9 and out through outlet 4. The height of wall 9 therefore controls the head of molten liquid above the nozzles 7 in the plate 6. A steam coil 10 is provided in the internal tank.

The prilling head and distributor plate assembly is mounted at the top of a conventional prilling tower.

As can be seen from FIG. 2, the nozzles 7 in the distributor plate 6 are capillary tubes 11 which pass through plate 6. The interior of tube 11 is given a coating 12 of a mixture of the epoxy prepolymer and the hardener sold under the Trade names of Araldite AY18 and Araldite HZ18 respectively dissolved in methyl ethyl ketone. The mixture is cured in situ by heating. The exterior surface, which it will be noted tapers due to a decrease in wall thickness of the tube 11 from the plate to the tube orifice, is provided with a silicone coating 13. The rim 14 of the orifice of tube 11 is sharp due to the taper on the tube. The exterior surface of the plate 6 is given a coating 15 of silicone. In one alternative form of distributor plate, the plate 6 is made of polytetrafluoroethylene in which case the coating 15 is not required. In a further alternative form, the plate 6 and nozzles 7 are formed from an epoxy resin, in which case coating 12 is omitted.

In use, steam is passed through the steam jacket 2 and the coil 10 to heat the prilling head and distributor plate. Molten ammonium nitrate is fed to the internal tank via inlet 3, fills the internal tank, overflows wall 9 and flows out via outlet 4 to be recycled. Molten material in the internal tank also flows out through the nozzles 7 to form streams of droplets.

EXAMPLE 1

A distributor plate made from mild steel with stainless steel nozzles was used in the assembly of FIG. 1 to prill ammonium nitrate at 175°C. In a preliminary run the nozzle bores were untreated and the maximum prilling rate using a gravity feed with a head of 7 cms of molten material above the nozzle tips was 1.2 kgs of ammonium nitrate per minute. By way of comparison, the plate and nozzles were cleaned and re-used in a run under identical conditions, except that in this case the bores of the nozzles had been coated with the Araldite epoxy resin. The prilling rate was 1.8 kgs of ammonium nitrate per minute.

EXAMPLE 2

A prilling head was constructed essentially as shown in FIG. 1 and mounted at the top of a prilling tower 5 meters high and 3 meters in diameter. Air containing a mixture of talc and fullers' earth (20:80 weight ratio, 100 percent less than 50 microns) was blown up the tower at a rate of 0.5 to 0.7 meters per second so as to form a fluidised bed of coarser particles some 1.5 meters deep at the base of the tower and a dust zone containing 0.0016 gram dust per cc of gas in the top 3.5 meters of the tower. The gas stream left the top of the tower by a side vent and was passed to a dust collector where dust was removed for recycling before the gas was vented to the atmosphere.

The bores in the distributor plate were formed from stainless steel capillary tubes 1.27 cms long and 0.81 mms internal diameter.

Ammonium nitrate (99.6% $NH_4NO_3$) was prilled through the bores at 175°C at a head of 7 cms above the bore outlets into the dust filled tower. In one case the nozzle bores were untreated, in the second case the bores were treated with a silicone and in the third case the bores were treated with the Araldite epoxy resin. The mean production rate over a period of hours for each case was 10, 7 and 15 grams per nozzle respectively.

I claim:

1. In a process for prilling material selected from the group consisting of ammonium nitrate and urea comprising:
    a. flowing a melt of said materials through a plurality of bores in a distribution plate of a prilling head located in a cooling tower to form droplets falling within said cooling tower;
    b. cooling and solidifying said falling droplets in said cooling tower;
the improvement comprising:
    c. said bores having an interior surface formed of epoxy resin.

2. The improved process of claim 1, wherein said epoxy resin surface consists of an in situ cured prepolymer derived from epichlorhydrin and bisphenol, said bisphenol being selected from the group consisting of:
    diphenylol methane, diphenylol propane and di-(dichlorophenylol);
and the curing agent being selected from the group consisting of:
    m-phenylenediamine, 4-4' methylenedianiline, diaminophenyl sulphone, dimethylaminomethyl phenol, tri-(dimethylaminomethyl) phenol, phthalic anhydride, maleic anhydride and trimellitic anhydride.

3. The improved process of claim 2, wherein the exterior of the distribution plate has a coating selected from the group consisting of:
    i. silicone resin, and
    ii. polytetrafluoroethylene.

4. The improved process of claim 3, further comprising stainless steel capillary tube nozzles of 12 – 15 mm length and 0.75 – 2 mm internal diameter, removably mounted within said bores and extending downward therefrom, the interior of said bores being coated with epoxy resin and the exterior being coated with a coating selected from the group consisting of:
    i. silicone resin, and
    ii. polytetrafluoroethylene.

5. The improved process of claim 1, wherein the material to be prilled contains less than 0.5 percent water and is selected from the group consisting of:
    i. ammonium nitrate containing not more than 30 percent by weight ammonium phosphate; and
    ii. urea containing not more than 30 percent by weight of ammonium phosphate.

6. The improved process of claim 1 further comprising flowing a gas stream containing suspended particulate material upward through the cooling tower as the droplets fall downward therethrough to achieve more rapid cooling and treatment of the falling droplets, said particulate material consisting of a mixture of particulate materials having at least one component which is less readily absorbed by the falling droplets than the other components, whereby the height of the cooling tower necessary to achieve proper cooling can be decreased and whereby by varying the proportions of the components of the mixture the amount of components picked up by the droplets will vary.

7. The improved process of claim 6 wherein the mixture of particulate materials flowing upward through the cooling tower is selected from mixtures consisting of:
    i. 95 – 40 parts by weight of Fullers' earth, bentonite, or montmorillonite with 5 – 60 parts by weight of talc;
    ii. 5 – 20 parts by weight of magnesium oxide with 80 – 95 parts by weight of talc; and
    iii. 50 – 90 parts by weight of phosphate rock to 10 – 50 parts by weight of talc and not more than 2.5 parts by weight of magnesium oxide.

* * * * *